UNITED STATES PATENT OFFICE.

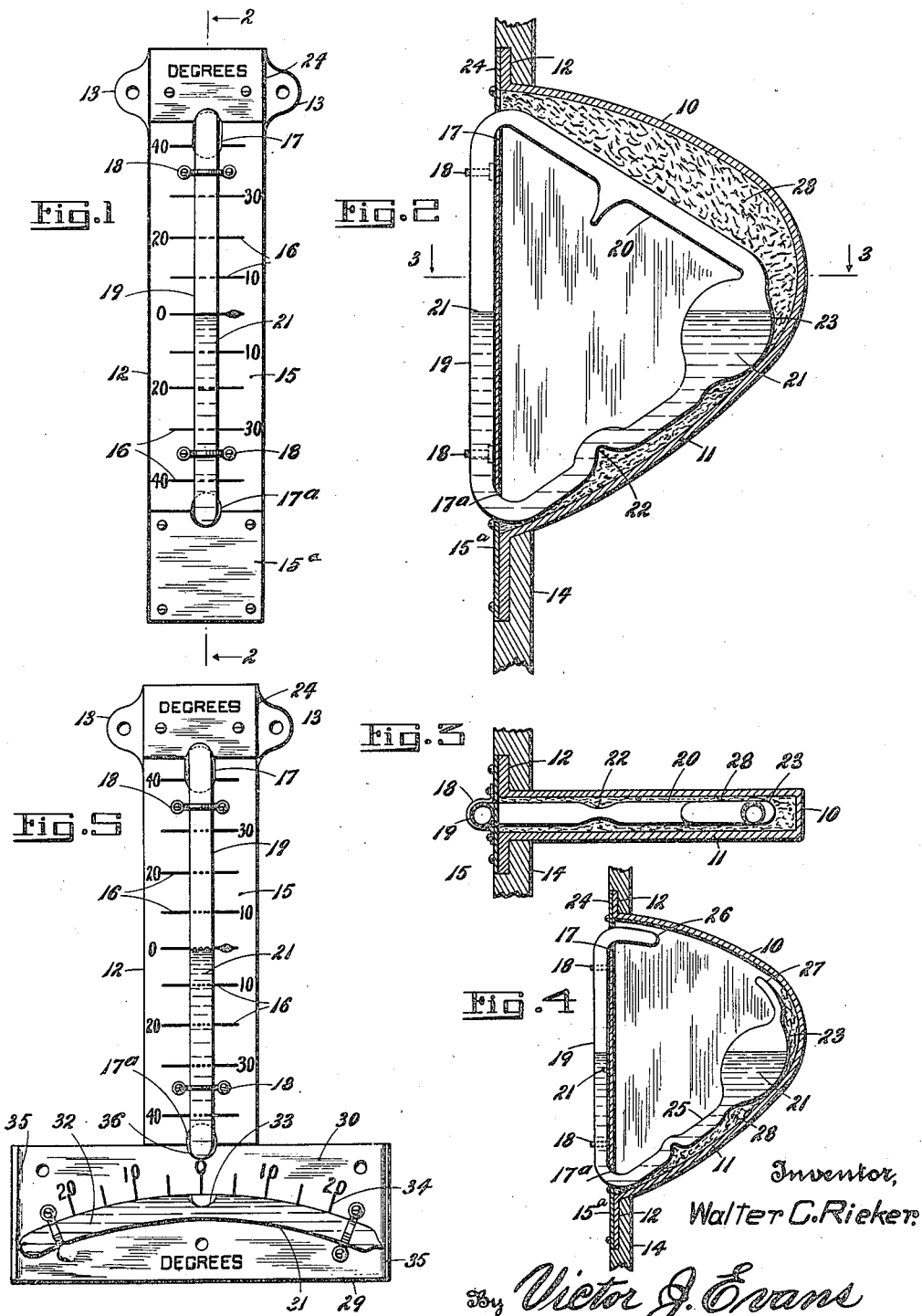

WALTER C. RIEKER, OF PHILADELPHIA, PENNSYLVANIA.

ANGULARITY-INDICATOR.

1,305,935. Specification of Letters Patent. Patented June 3, 1919.

Application filed January 29, 1918. Serial No. 214,366.

*To all whom it may concern:*

Be it known that I, WALTER C. RIEKER, a citizen of the United States, residing at 1921 Fairmount avenue, Philadelphia, in the county of Philadelphia and State of Pennsylvania, have invented new and useful Improvements in Angularity-Indicators, of which the following is a specification.

The invention relates to indicators, and has for an object to provide an instrument for indicating the angularity of an object or body as to a vertical or horizontal axis or plane.

My invention is particularly adaptable for aeroplanes to indicate the angle of ascent or descent, or in other words, to at all times inform the aviator as to whether his aeroplane is ascending or descending in the atmosphere, and further to inform him as to the angle of inclination of the machine, whether it be absolutely horizontally disposed, or tilted to one side or the other, or forward or backward.

My invention is of course also adaptable to various other forms of machinery and mechanism, and also to automobiles, to be placed upon the instrument board to indicate to the driver the angle of ascent or descent of a hill. However, I especially adapt my invention to aeronautics, and to this end have specially designed the various parts to fit the usual instrument board of an aeroplane, so that the scale graduations can be readily observed by the aviator.

In the further disclosure of the invention, reference is to be had to the accompanying drawings, constituting a part of this specification, in which similar characters of reference denote corresponding parts in all the views, and in which—

Figure 1 is a front elevation of a form of my indicator.

Fig. 2 is a vertical sectional view taken through the indicator on the line 2—2 of Fig. 1, showing the indicator applied to an instrument board.

Fig. 3 is a horizontal sectional view taken on the line 3—3 in Fig. 2.

Fig. 4 is a fragmentary vertical longitudinal sectional view taken through a slightly modified form of indicator, and Fig. 5 is a front elevation of still another form of my indicator, showing the inclinometer used in connection therewith.

Referring more particularly to the views, I provide a casing 10, having a portion 11 of a somewhat parabolical configuration and quite narrow, with the front terminating in a plate-like portion 12 in the nature of a face, having a plurality of opposed ears 13, the opening to the casing 10 appearing as a slot in the face 12. It will be seen that the casing 10 can be readily applied to the usual instrument board 14 of an aeroplane, with the face directly against the board and flush therewith, and it will be understood that the casing is disposed immediately in front of the aviator, and in full view at all times. A graduated or scale plate 15 is provided to be placed against the face of the casing, and to be suitably held thereon by screws or otherwise, said scale plate having a series of graduations 16 thereon, commencing from the mark zero and increasing numerically downwardly from zero, and upwardly from zero, these graduations denoting inclination as to ascent or descent from a horizontal plane. The scale plate 15 is provided with an upper notch 17 and a lower notch 17ᵃ, and extending across the scale plate from the top to the bttom thereof and fitting in said notches, and further secured to the plate by suitable clamps 18, is a portion 19 of a triangular tube 20 containing alcohol indicated by the numeral 21, the tube being formed with a constriction 22 and an enlarged oval shaped reservoir 23. A suitable plate with the word "degrees" or some other designation and which is indicated by the numeral 24, may be also attached to the face of the casing, with its lower end abutting against the upper notched end of the scale plate 15. A similar plate 15ᵃ is attached to the face of the casing with its upper end abutting against the lower notched end of the scale plate 15. The plates 24 and 15ᵃ are also notched as shown. Thus it will be seen that the scale plate and front of the entire device will present a neat and effective appearance, and the alcohol in the tube being colored, ready association of the height of the column of alcohol in the portion 19 with the scale graduations can be made.

Attention is called to the fact that if the tube containing the alcohol were a continuous tube of the same diameter throughout its length, with no constriction or reservoir, the alcohol appearing in the column associated with the graduations on the scale plate, would vary so quickly that in the use of a device of this character on an aeroplane or other moving body, it would hardly be possible to obtain an accurate reading on account of the jumping of the alcohol in the column, owing to the slight changes of inclination that might take place. Therefore, in order to have the column of alcohol act in a deliberate but positive manner, I have provided the constriction 22 and the reservoir 23, thus balancing the column of alcohol, if the term may thus be used, so that whether the column ascends or descends in the exposed portion of the glass tube, it will do so in a positive but more deliberate manner than otherwise, as mentioned heretofore.

It is also essential to the successful use of the angularity indicator that the reservoir 23 and the constriction 22 be provided in that leg of the tube that reaches upwardly and rearwardly from the lower end of the front upright portion of the tube, with the constriction 22 at a point intermediate of the reservoir 23 and the front upright tube portion. This will be better appreciated when it is stated that it is necessary for the fluid to move in a reasonably prompt manner in the upright front portion of the tube, which requirement is met by the fall or head of fluid from the relatively elevated reservoir 23; also, that it is necessary to avoid spasmodic jumping of the fluid in the upright tube portion, which requirement is met by the constriction between the reservoir and the lower end of the tube.

In the application of my invention to an aeroplane, it will be clear that the device applied to the instrument board will be so arranged that when the machine is in a horizontal plane, the column of alcohol will be at zero, and when the machine is tilted upwardly, the column of alcohol will rise in the exposed tube and the operator can then read on the scale plate above the zero mark, the angle of ascent. So also if the machine is in the air and assumes a descending direction from its normal horizontal plane, the column of alcohol in the exposed part of the tube will descend therein below the zero mark, and indicate to the aviator the angle of descent. In this manner the aviator can tell and determine absolutely at what angle from the horizontal he is ascending or descending, and thus in accordance with the height he is from the ground, or the particular place he desires to fly to, he can increase or decrease the angle of ascent or descent, as he sees fit.

In Fig. 4 I show a slightly modified form of my invention in which, instead of showing a continuous triangular form of tube, the tube indicated by the numeral 25, is cut off at the points 26 and 27, as shown. Of course the interior of the casing 10 can be lined or padded with a suitable padding 28, so that when the aeroplane is subjected to a jar or shock, it will not cause the tube to become broken.

In Fig. 5 I show a more complete form of my apparatus in which I use one of the constructions shown in Figs. 1, 2, 3 and 4, together with an attached inclinometer 29, consisting of a plate 30 which is suitably attached to the casing 10, and more particularly to the face 12 thereof, said plate 30 being horizontally disposed and having attached thereto a suitable segmentally shaped tube 31 filled with alcohol, indicated by the numeral 32, on which is formed an air bubble 33. Suitable graduations 34 on the face of the plate indicate the degrees of the angle of inclination to the right or to the left, the ends of the plate 30 being bent upwardly to form lips 35 which protect the ends of the tube, so that the same cannot be easily struck or broken. The plate 29 is preferably notched as at 36 to fit around the lower part of the exposed column of the tube of the indicator described heretofore.

Now it will be seen that whereas the indicator heretofore described, will indicate the angle of ascent or descent of the aeroplane, the inclinometer will indicate the inclination of the aeroplane to the right or to the left, as to its tilting, and thus in making a turn in the air the aviator can readily discern the angle at which the machine is tilted in making the turn.

It will of course be understood that the scale graduations on the scale plates may be etched or stamped thereon as desired, and may be of illuminating or non-illuminating type, depending entirely on the use to which the device is to be put, and the manner in which the apparatus is to be used.

It will be understood that I do not limit myself to the particular disclosure herein; that various slight changes may be made from the construction set forth without departing from the spirit of the invention, and the scope of the invention is defined in the appended claim.

I claim:

The combination of an instrument board having an opening, a narrow casing fixed in the opening in the board and extending at right angles to the board and open at its end adjacent thereto, a scale plate closing said open end of the casing and having upper and lower notches, a tube, and an indicating fluid in the tube; the tube including an upright portion in front of the plate, an angularly disposed portion at the upper end of the upright portion and extending through the upper notch of the plate, and a leg reaching upwardly from the lower end of the upright portion and extending through the lower notch of the plate and having a reservoir elevated relatively to said end and also having a constriction at an intermediate point between the reservoir and the lower end of the upright portion and spaced from said reservoir and end.

In testimony whereof I affix my signature.

WALTER C. RIEKER.